May 8, 1956 W. N. DIBBINS 2,744,755

MAGNETIC TAPE EDITING MACHINE

Filed July 21, 1950

INVENTOR.
WALTER N. DIBBINS
BY Val R. Goslaw
ATTORNEY

United States Patent Office 2,744,755
Patented May 8, 1956

2,744,755

MAGNETIC TAPE EDITING MACHINE

Walter N. Dibbins, Copiague, N. Y., assignor to Radio Corporation of America, a corporation of Delaware Application July 21, 1950, Serial No. 175,171

The terminal 15 years of the term of the patent to be granted has been disclaimed 5 Claims. (Cl. 274—4)

This invention relates to sound film editing, and particularly to a machine for editing magnetic sound tape or film.

In the recording of sound on a strip of film, either photographically or magnetically, many sequences are not desired in the final sound record. Thus, it is necessary to delete certain portions and perhaps rearrange other portions, which requires cutting and splicing. To determine the points on the film, such as the beginnings and endings of certain sound sequences, is one of the purposes of this invention. With photographic film, this could be accomplished by visibly observing the sound track on the film. With magnetic sound records, the tracks cannot be seen, and it is necessary, therefore, to determine the beginnings and endings of signal sequences or other points on the film by other methods than visual observation.

The present invention is directed to an editing machine to rapidly provide a finished magnetic film or tape ready for reproduction. Such a machine is particularly desirable where magnetic sound records are prepared for radio and television, particularly where there is only a short time in which to accomplish the editing of the original recording. The machine is especially suitable for magnetic sound tape without sprocket holes, although it may also be adapted to perforated thirty-five millimeter or perforated sixteen millimeter film of the motion picture type. The machine functions by reproducing the magnetic record and then marking the film at the exact point where it is to be cut. This is accomplished by spacing the reproducing unit and the marking unit in accordance with the speed of the operator's reflexes.

The principal object of the invention, therefore, is to facilitate the editing of magnetic sound film or tape.

Another object of the invention is to provide an improved editing device for marking, cutting, and splicing magnetic sound tape.

A further object of the invention is to provide an improved magnetic sound film editor whereby the film may be rapidly and accurately marked at the point at which it is to be cut.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational view of the machine of Fig. 1 and taken along the line 2—2 thereof.

Figure 1:
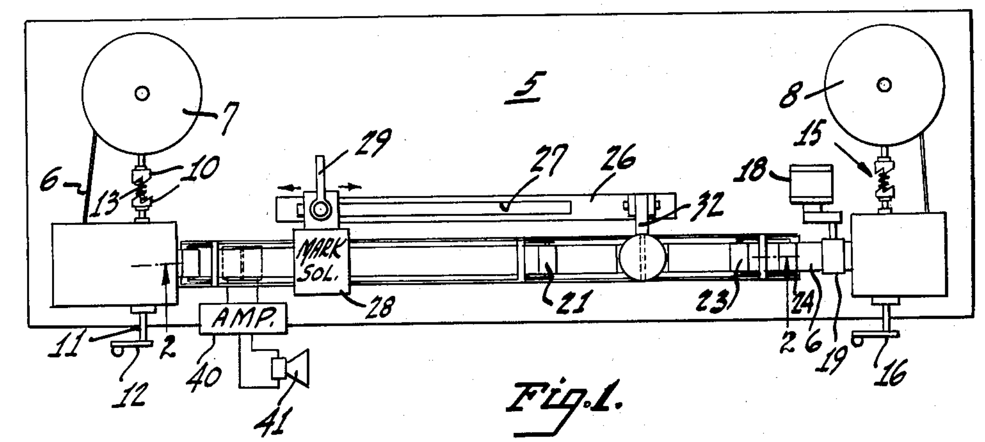
Fig. 1 is a plan view of an editing machine embodying the invention.
Figure 2:
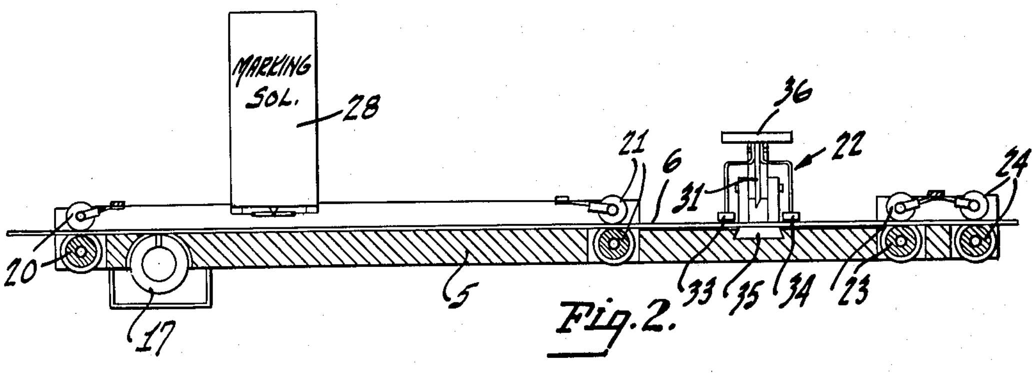

Referring now to the drawings, in which the same numerals identify like elements, the machine is formed from a channel 5 over which a magnetic film 6 passes from a supply reel 7 to a takeup reel 8. The reel 7 may be turned by hand when a clutch 10 is engaged by longitudinal pressure on a crank shaft 11 having a hand crank arm 12. Upon release of the pressure, a spring 13 disengages the clutch. A similar clutch is shown at 15 with a hand crank 16 to operate reel 8. Positioned in an opening in the frame 5, is a magnetic reproduce head 17, over the gap of which the tape 6 passes. The head feeds an amplifier 40 connected to a loudspeaker 41.

The film reel 8 is driven by a motor positioned thereunder, while the film is advanced along the frame 5 by a motor 18 geared to a capstan 19. The film passes from the reel 7 between a pair of rollers 20, over the soundhead 17, under a marking unit 28, between a pair of rollers 21, under a cutting unit 22, and between two pairs of rollers 23 and 24 to the reel 8.

Figure 3:
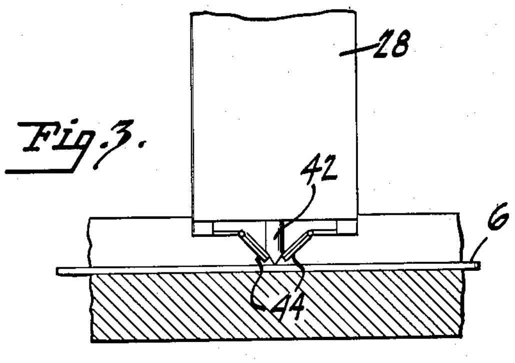
Fig. 3 is a detailed view of the marking unit of the machine.
Figure 5:
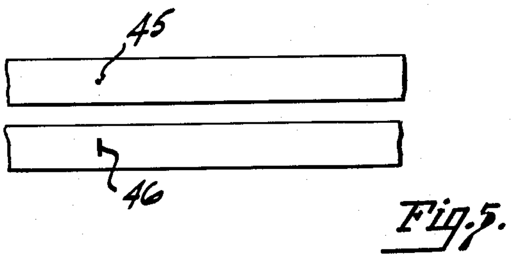
Fig. 5 is a sectional view of two magnetic tapes showing two different types of marks.

Mounted on a bracket 26 is marking unit 28, which is slidable in a track groove 27. After the correct position of the unit is found, it may be locked therein by the handle 29 of a set bolt. The unit 28 includes a solenoid having a winding 49, which, when energized, lowers a marking plunger 42. The marking point on the plunger may be a circle or dot, as shown at 45, or a line, as shown at 46 in Fig. 5. When the winding 49 is not energized, the marking point rests against two ink pads 44, which are spring mounted and depressed when the winding is energized, as shown in Fig. 3.

Figure 4:
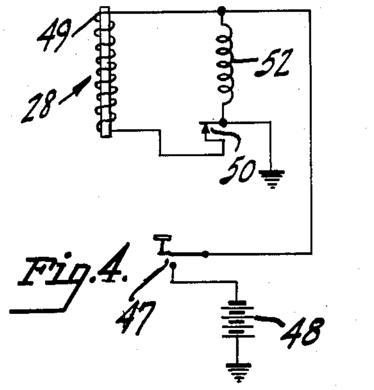
Fig. 4 is a detailed schematic view of the electrical circuit for the marking unit.

To insure that the point just makes contact with the moving tape and is then immediately released so as not to smear the mark, the circuit shown in Fig. 4 is used. The operator's switch is shown at 47 and is connected to an energizing battery 48 and to the winding 49 of the unit 28, then over a relay contact 50, back to battery 48. In shunt to the winding 49, is a relay winding 52, which, upon energization, opens contact 50. The relay 52 is slow to operate so that the plunger 42 will make contact with the tape 6 upon the closing of switch 47, but immediately thereafter will be released by the operation of relay 52 breaking the winding 49 circuit at contact 50.

The cutting unit 22 comprises a blade 31 of hardened nonmagnetic metal attached to hinged arm 32. Attached to each side of the knife are spring clamps shown at 33 and 34, the purpose thereof being to hold the tape taut while it is being cut. A cutting block 35 of wood or similar material is directly under the knife to prevent it from dulling. The knife is operated by pressure on pad 36.

To operate the machine, the film is threaded as shown in Fig. 1 and the motor 18 and the motor of reel 8 are energized. The operator will adjust the position of the marking unit 28 along the groove 27 to a point to compensate for the speed of his reflexes in operating the unit. That is, when the operator hears the reproduction of a point on the tape, that point will be directly under the marking unit when he closes the marking unit switch 47. After this position is found, the operator then need only press the marking switch when he hears the point reproduced. For instance, the operator may mark the beginning and end of a sequence to be removed. The tape is then stopped and the tape cut at the last mark by placing the mark under the cutting knife. The end of the tape is then pulled out of the channel until the next mark appears. The tape is then cut at this point. The two ends of the tape in the channel may then be spliced, and the machine is ready to go to the next editing point. If a piece of film is to be inserted, the point is marked and cut and the new piece is added. The slack is taken up by hand operation of one of the reels.

Since all operations are done in a horizontal plane, and since the marking unit and the knife are easily accessible, a roll of magnetic tape or film may be very quickly cut and spliced to rapidly remove and insert sections and provide the finished roll to be reproduced.

I claim:

1. A magnetic sound record tape marking machine comprising a frame, a magnetic sound record tape, means for advancing said tape along said frame for visible observation of said tape, a reproducing magnetic head for the record on said tape and mounted on and adjacent one end of said frame, a tape marking unit mounted on said frame and spaced from said head in the direction of movement of said tape, said unit including a tape contacting element, an electrical circuit for actuating said element, means in said electrical circuit for automatically controlling the length of time said contacting element is in contact with said tape, and a mounting for said unit to adjust the position of said unit along said tape at a position at which said element will contact said tape at a point thereon reproduced by said head, said automatic control means including a slow-to-operate relay simultaneously energized with the energization of said electrical circuit for actuating said element and adjusted to break said electrical circuit immediately after said tape contacting element has contacted said tape.

2. A magnetic sound record tape marking machine comprising a frame, a magnetic sound record tape, means for advancing said tape along the top of said frame, a reproducing magnetic head for the record on said tape and mounted on and adjacent one end of said frame, a tape marking unit mounted on said frame and spaced from said head in the direction of movement of said tape, said unit including a tape contacting element, an electrical circuit for actuating said element, means in said electrical circuit for automatically controlling the length of time said contacting element is in contact with said tape, and a mounting for said unit to adjust the position of said unit along said tape at a position at which said element will contact said tape at a point thereon reproduced by said head, said automatic control means including a source of electrical energy, a solenoid for actuating said contacting element, a manually operable switch interconnecting said source and said solenoid when said switch is closed, and a slow-to-operate relay connected in shunt to said solenoid and simultaneously energized by the closure of said switch, said relay having a circuit contact opened by energization of said relay for de-energizing said solenoid.

3. A magnetic sound record tape editor comprising a frame, magnetic tape reels adjacent the ends of said frame, motor driving means for advancing said tape along the top of said frame between said reels, manual means for operating said reels, a magnetic reproducing head adjacent one end of said frame for reproducing signals on said tape, and a tape marking unit, said tape being advanced under said marking unit, said marking unit including a solenoid, a plunger moved by said solenoid when energized, an inking pad for the marking point on said plunger when said plunger is de-energized, a source of energy for said solenoid, a manual switch for connecting said source to said solenoid, and a slow-to-operate relay simultaneously energized by the closure of said switch and connected in shunt to said solenoid and having a circuit contact opened by energization of said relay for de-energizing said solenoid for releasing said plunger immediately after said marking point contacts said tape.

4. A magnetic tape editing machine for marking magnetic tape comprising a channel frame over the top of which said tape is adapted to be passed horizontally, a magnetic reproducing head adjacent one end of said channel and over which said tape is adapted to be passed, a bracket, a marking unit adjustably mounted on said bracket and under which said tape is adapted to be passed, said unit including a solenoid and a marking plunger, energization of said solenoid moving the end of said plunger into contact with said tape, and automatic electrical means for controlling the length of time said plunger is in contact with said tape, a switch for energizing said automatic electrical means, said automatic electrical means including a slow-to-operate relay energized simultaneously with the energization of said solenoid and adjusted to de-energize said solenoid immediately after said solenoid has been energized and said marking plunger actuated.

5. A magnetic tape editing machine for marking magnetic tape, comprising a channel frame over the top of which said tape is adapted to be passed horizontally, a magnetic reproducing head adjacent one end of said channel and over which said tape is adapted to be passed, a bracket, a marking unit adjustably mounted on said bracket and under which said tape is adapted to be passed, said unit including a solenoid and a marking plunger, energization of said solenoid moving the end of said plunger into contact with said tape, a manual switch, an energy source, a circuit interconnecting said solenoid, said switch, and said energy source when said switch is closed, and means for de-energizing said solenoid after a predetermined time period, said last mentioned means including a slow-to-operate relay simultaneously connected in shunt with said solenoid, said solenoid having a circuit contact opened by the energization of said relay, the opening of said contact de-energizing said solenoid.

References Cited in the file of this patent

UNITED STATES PATENTS

| | | |
|---|---|---|
| 786,907 | Lackie et al. | Apr. 11, 1905 |
| 1,150,563 | Walker | Aug. 17, 1915 |
| 1,801,755 | Price | Apr. 21, 1931 |
| 2,251,306 | Thompson | Aug. 5, 1941 |
| 2,343,114 | Neumann | Feb. 29, 1944 |
| 2,497,142 | Shepherd | Feb. 14, 1950 |
| 2,515,968 | Shanklin | July 18, 1950 |
| 2,535,498 | Kornei | Dec. 26, 1950 |
| 2,540,406 | Ranger | Feb. 6, 1951 |
| 2,610,061 | Kegan | Sept. 9, 1952 |